US007045169B2

(12) United States Patent
Freeman et al.

(10) Patent No.: US 7,045,169 B2
(45) Date of Patent: May 16, 2006

(54) METHOD OF PREDICTING OPTICAL PROPERTIES AND PHYSICAL CHARACTERISTICS TO FORMULATE OPTIMUM COATING SYSTEM

(75) Inventors: Gary M. Freeman, Macon, GA (US); Richard D. Carter, Macon, GA (US); Aristide C. Dogariu, Winter Springs, FL (US)

(73) Assignee: J.M. Huber Corporation, Edison, NJ (US)

( * ) Notice: Subject to any disclaimer, the term of this patent is extended or adjusted under 35 U.S.C. 154(b) by 0 days.

(21) Appl. No.: 10/233,578

(22) Filed: Sep. 4, 2002

(65) Prior Publication Data

US 2003/0124244 A1  Jul. 3, 2003

Related U.S. Application Data

(60) Provisional application No. 60/317,100, filed on Sep. 4, 2001.

(51) Int. Cl.
- *B05D 5/06* (2006.01)
- *D21H 19/36* (2006.01)
- *D21H 19/40* (2006.01)
- *D21H 23/78* (2006.01)

(52) U.S. Cl. ............. 427/180; 427/201; 427/445; 162/135; 106/632

(58) Field of Classification Search .......... 427/180, 427/201, 243, 245, 326, 411, 444, 445; 162/134–137; 73/159; 106/632
See application file for complete search history.

(56) References Cited

U.S. PATENT DOCUMENTS

| 5,231,472 | A | * | 7/1993 | Marcus et al. ............... 356/402 |
| 5,929,998 | A | * | 7/1999 | Kettler et al. ............... 356/405 |
| 6,064,487 | A | * | 5/2000 | Kettler et al. ............... 356/402 |
| 6,256,102 | B1 | | 7/2001 | Dogariu |
| 6,525,823 | B1 | | 2/2003 | Dogariu et al. |

(Continued)

OTHER PUBLICATIONS

Chandrasekhar, S., Radiative Transfer, 1960, vii-xiv, 1-55, 70, 127, 161-171, 208-209, 344-345, 354-355, 364-365, Dover Publications, Inc., New York, N.Y.

Popescu, G., et al., Optical path-length spectroscopy of wave propagation in random media, Optics Lettes, Apr. 1, 1999, 442-444, vol. 24, No. 7, Optical Soc. Of America.

(Continued)

*Primary Examiner*—Timothy Meeks
*Assistant Examiner*—Wesley D. Markham
(74) *Attorney, Agent, or Firm*—Raymond Hoch; Carlos Nieves

(57) ABSTRACT

Method of predicting optical properties and physical characteristics of coated paper or other sheet products for the purpose of formulating enhanced coating or sheet forming systems, and in particular to a method, which uses a diffusion approximation model derived from a radiative transfer theory employing various inputs of the properties and/or characteristics to predict coating or sheet system performance.

21 Claims, 7 Drawing Sheets

U.S. PATENT DOCUMENTS 6,559,950 B1 5/2003 Dogariu et al.
6,587,206 B1 7/2003 Dogariu et al.
6,738,144 B1 5/2004 Dogariu

OTHER PUBLICATIONS

Freeman, G., et al., "Diffusion Model For Predicting Coated Paper Scattering," TAPPI Coating Conference, 2002, 15 pages total.

Popescu, G., et al., "Dynamic light scattering in subdiffusive regimes," Applied Optics, Aug. 20, 2001, 4215-4221, vol. 40, No. 24, Optical Soc. Of America.

Popescu, G., et al., "Evidence of scattering anisotropy affects on boundary conditions of the diffusion equation," Physical Review E, Apr. 2000, 4523-4529, vol. 61, No. 4. Am. Phys. Soc.

* cited by examiner

METHOD OF PREDICTING OPTICAL
PROPERTIES AND PHYSICAL
CHARACTERISTICS TO FORMULATE
OPTIMUM COATING SYSTEM

CROSS-REFERENCE TO RELATED
APPLICATIONS

This application claims the benefit of priority under 35 U.S.C. §119(e) to U.S. Provisional application Ser. No. 60/317,100, filed Sep. 4, 2001, the entire disclosure and contents of which are incorporated herein by reference for all purposes.

TECHNICAL FIELD

The present invention is directed to a method of predicting optical properties and physical characteristics of coated paper products for the purpose of formulating enhanced coating systems, and in particular to a method, which uses a diffusion approximation model derived from a radiative transfer theory employing various inputs of the properties and/or characteristics to predict coating system performance.

BACKGROUND ART

The utilization of Kubelka-Munk (K-M) theory and variations thereof in the paper coating industry for determining scattering coefficients is well known. The K-M theory, along with pore structure information (e.g., pore volume, pore diameters, etc.) obtained from mercury intrusion porosimetry measurements, is widely used to characterize paper coatings and to design, predict or enhance the understanding of coated paper properties.

The principal advantage of using the K-M theory is its mathematical simplicity, but this simplicity is in effect a tradeoff for a loss of explicit connection with the optical properties of the individual components within a diffusive layer that are part of a coating system. One particular problem with the use of the K-M theory as an aid to assessing performance of coating systems is its treatment of scattering as being caused by a homogenous medium, rather than a collection of individual scattering centers. Under the K-M approach, isotropic scattering of light is considered to occur, but in real systems, light is scattered anisotropically.

Another problem with the K-M theory is its limited number of degrees of freedom and the inability to address all of the other variables that exist in a pigmented coating system, e.g., coating thickness, properties of the base sheet, certain properties of the pigment, both physical and optical, the boundary layer conditions associated with the coating layer, etc. Thus, the K-M approach, while sometimes a reasonable approximation depending on the homogeneity of the medium, is deficient in predicting the actual light scattering effects in non-homogenous coating systems having multiple scattering centers as well as boundary layer effects and can therefore only predict performance properties to a certain extent.

Accordingly, a practical need exists to provide improved ways to predict coating performance for paper coating systems, including taking into account the boundary conditions for the coating layer, such as the surface roughness of the coating and the properties of the interfacial region between the base sheet and the coating, coating thickness, anisotropic scattering of light, use of pigments having varied particle size distribution characteristics, and the like. The present invention solves this need through the utilization of a diffusion approximation model and its adaptation through the identification of various inputs to the model that relate to both the physical characteristics and the optical properties of coating systems. Using selected inputs and the diffusion approximation model, one can predict the performance of a coating system. This ability is especially useful when making predictions for coating systems being designed to meet certain targeted optical or physical characteristics for a particular end-use application. In this mode, the model can determine what physical characteristics are needed to meet specific coating performance targets in the form of optical properties such as brightness, gloss, and opacity.

U.S. Pat. No. 6,064,487 to Kettler et al. discloses a process for calculating a color formulation of a pigmented special effect shade that include determining optical reflection factors using a radiation transport model, particularly an azimuth-independent form thereof. Kettler et al. are primarily concerned with developing a paint formulation to match that of an existing automobile. However, the method disclosed in this patent is totally unrelated to modeling the coating systems and coating performance properties that are relevant to the paper industry.

SUMMARY OF THE INVENTION

It is a first object of the present invention to provide a method of predicting the optical properties or physical characteristics of coating systems and more particularly of pigmented paper coatings.

Another object of the present invention is a method that identifies one or more target properties of a coating system, generates a predictive value of the coating system based on a number of inputs. These inputs are related to various optical or physical characteristics of the coating system as well as its boundary conditions for comparison to the targeted value(s), and by altering these inputs enables additional predictive values to be generated until the target property is attained.

Another object of the present invention is the use of a diffusion approximation model, which incorporates a number of inputs of coating system variables to generate the predictive values.

One further object of the invention is a method of predicting the performance properties or physical characteristics of coating systems that use kaolin clay or calcium carbonate as one of the coating pigments as well as various combinations of kaolin clay and calcium carbonate.

Other objects and advantages of the present invention will become apparent as a description thereof proceeds.

In one embodiment, the invention entails the use of radiative transfer theory to predict optical properties and/or physical characteristics in paper coating systems that employ a base sheet and/or a coating comprised of one or more pigments and/or fillers. For example, any one of the fine particle kaolin clays produced by J. M. Huber Corporation from middle Georgia cretaceous clay crudes or east Georgia tertiary clay crudes can be used as one of the coating pigments. Representative examples of coating grade, kaolin clays produced by J. M. Huber Corporation include COVERGLOSS, HYDRAGLOSS 90, HYDRAFINE 90, HYDRASPERSE, HYDRAPRINT, HYDRAMATTE and LITHOPRINT. Other coating pigments include calcined kaolin clays, ground or precipitated calcium carbonates, synthetic amorphous silicas, precipitated metal silicates such as the sodium magnesium aluminosilicates, talc, titanium dioxide, carbon black, etc. Examples of the optical properties for the coating systems that can serve as inputs, targets, or outputs include TAPPI brightness, gloss, opacity and its reflectance spectrum over the visible wavelength range.

Exemplary physical characteristics of the coating pigment or coated paper product for use in the invention include absorption coefficient, scattering coefficient, anisotropic light scattering, pigment refractive index, coating porosity characteristics such as the pore diameter size and total pore volume, the coating pigment's median particle size and its particle size distribution, coating thickness, surface roughness of the coating, characteristics associated with the interfacial region between the pigmented coating layer and the base sheet, the optical properties of the base sheet, the physical characteristics of the base sheet and the like. This list is not a complete list and other variables of the coating system that may affect performance can also be used as would be within the skill of the artisan and the level of predictive accuracy desired.

The diffusion approximation model is in the form of a mathematical expression for which a computer program can be written. Hence, the required computations using the diffusion equation are preferably carried out by a computer so that predictions of coating performance properties and physical characteristics can be efficiently done.

When predicting at least one optical property of a coating system having a coating applied to a base sheet, the method entails providing a radiative transfer equation that relates a number of physical characteristics of the coating system selected from coating thickness, the coating pigment's median particle size, the coating pigment's particle size distribution, the coating median pore size, pore size distribution, the coating pore volume, surface roughness of the coating, scattering coefficient, absorption coefficient, anisotropy factor, and optical properties of a base sheet to one or more optical properties for a coating system selected from the group consisting of gloss, TAPPI brightness, opacity and its reflectance spectrum over the visible wavelength range of 450–700 nm. The diffusion equation is solved by inputting a number of the physical characteristics of the coating system to obtain at least one optical property output of the coating system.

This method is especially useful when first selecting at least one target optical property and comparing the output of the solved diffusion equation to the target optical property. If the predicted output does not match, one or more of the physical characteristics are adjusted and the solving step is repeated to obtain another optical property output. This output is then compared to the target, and the process is repeated again with another adjustment until the output matches the desired target. As previously discussed, the computations needed for this process are best carried out via a computer program to efficiently obtain the results.

The method is particularly adapted for coating systems that use a kaolin clay or a calcium carbonate as one of the coating pigments, the substrate to be coated is a paper product which serves as the base sheet and where formulating a pigmented coating using the inputted optical properties or physical characteristics for application onto said paper base sheet to form a coated paper product.

In one mode, the diffusion equation can be solved using the scattering coefficient, the absorption coefficient, and the anisotropy factor for scattering as inputs to obtain a brightness output of the coating system.

In another mode, the method predicts or identifies at least one physical characteristic of the coating system. The same diffusion equation is used, but the inputs are changed. The equation is solved by inputting a number of the physical characteristics and at least one optical property to obtain at least one physical characteristic output. This method allows for the identification of a certain physical characteristic necessary to achieve the inputted optical property. A target optical property can be selected as the input in order to predict what physical characteristic is necessary to obtain such an optical property. For example, in the case of targeting a desired opacity value, a particular coating pore size distribution or particle size distribution could be predicted.

BRIEF DESCRIPTION OF THE DRAWINGS

Reference is now made to the drawings of the invention wherein.

DETAILED DESCRIPTION OF THE INVENTION

Figure 1:
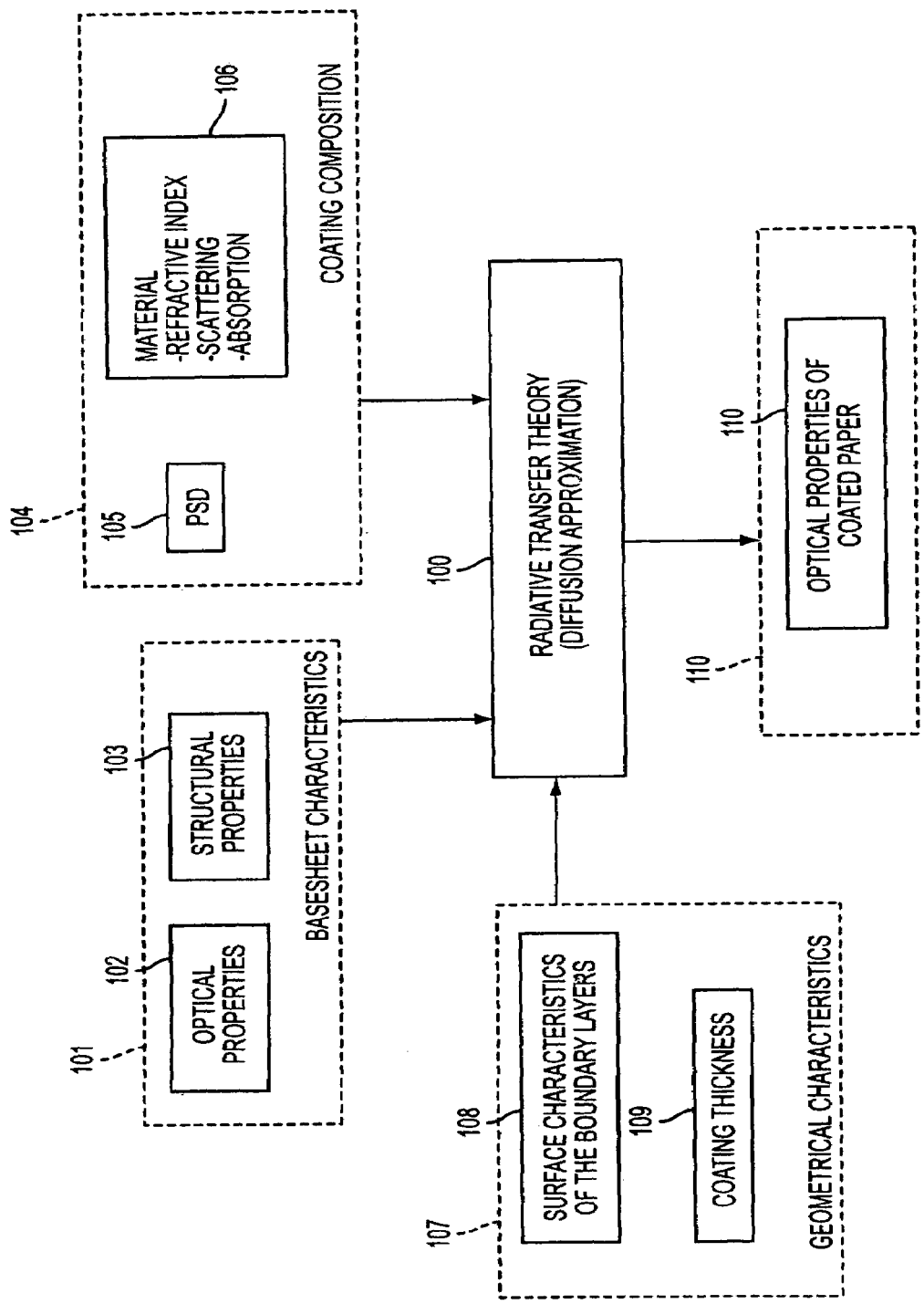
FIG. 1 is a schematic flowsheet identifying various inputs and outputs used to obtain predictive properties of coating systems.

The present invention is a significant advance in the field of modeling coating systems, particularly paper coating systems that use such parameters as TAPPI brightness, gloss, and opacity as performance guidelines for determining the coating system components to be employed. As a predictive tool, the invention provides a much improved technique for selecting the right combination of materials and variables making up a coating system so that that improved performance is realized. Especially advantageous is the ability to predict the optical performance properties of coating systems in the paper industry, particularly those employing a fine particle size kaolin clay or calcium carbonate as well as combinations thereof as the coating pigments. The predictive capability of the invention with respect to the use of fine particle kaolin clay and calcium carbonate pigments in coating systems is independent of whether these coating pigments have a broad or narrow particle size distribution.

The treatment of multiple light scattering that occurs in non-homogenous media, such as pigmented coating systems, can be handled using a diffusion approximation approach. When absorption is small compared to scattering, scattering is almost isotropic, and radiance is not needed close to the source or boundaries; hence, diffusion theory can be used as an approximation following from the general radiative transfer theory.

The principles of general radiative transfer theory and application of the diffusion approximation to the transport of light are both well known in the scientific literature. A comprehensive mathematical description of radiative transfer theory and the diffusion approximation are provided in S. Chandrasekhar ("Radiative Transfer", Dover Publ., copyright 1960), which is hereby incorporated in its entirety by reference. However, adapting the diffusion approximation approach for practical use as a predictive model of optical performance for coated paper systems has not until now been done. While all of the modifications of the diffusion approximation model are not specifically detailed herein, the identification of additional variables, such as polydispersivity, internal reflections, etc. permits one of skill in the art of radiative transfer theory to adjust the model to account for these additional variables as other types of input parameters or boundary conditions. The specifics of the model modifications when taking these other variables into account are not deemed necessary for understanding the scope of the current invention.

As compared to K-M theory, application of a diffusion approximation model as a more comprehensive treatment of light propagation is being utilized to better describe the optical properties of coating systems, particularly systems employing and calcium carbonate-based coatings and to correlate the coating system's observed reflectance spectra over the visible wavelength range with coating microstructure. The diffusion approximation describes light propagation inside a highly scattering medium having very low absorption. Unlike K-M theory that only considers isotropic scattering, the diffusion approximation is able to model anisotropic scattering as well. Also, using the diffusion approximation, the optical characteristics of the medium are related directly to the physical parameters of the scattering centers. When solving the diffusion equation with the appropriate boundary conditions, the diffuse reflectance from a scattering medium, denoted as R(Q), can be obtained in terms of (1) the scattering and (2) absorption coefficients of a scattering center, the (3) anisotropy factor, and (4) the potential spatial correlation between the scattering centers as described by the mathematical expression below:

$$R(Q) = \frac{3Q(1+Q+Qg)\left(\frac{Q}{3-3g+3Q}\right)^{-1/2} - 3[(1+Q)^2 + g(-1+Q+Q^2)]}{(-1+g-Q)\left(3+2\left(\frac{3Q}{1-g+Q}\right)^{1/2}\right)}; Q = \frac{\mu_a}{\mu_s}$$

where:
$\mu_s$ is the scattering coefficient
$\mu_a$ is the absorption coefficient
g is the anisotropy factor The above mathematical expression for diffuse reflectance, which assumes the boundary layers are smooth, is the simplest solution of the differential equation shown below which defines the diffusion approximation in terms of the average radiance U(r,t) as follows:

$$D\nabla^2 U(r,t) - \mu_a U(r,t) - \partial U(r,t)/\partial t = S(r,t),$$

wherein the isotropic source density is denoted by S(r,t), r and t are the variables of position and time, and D is the diffusion coefficient which is defined in units of length as $$D = 1/3[\mu_a + \mu_s(1-g)]$$

in terms of the absorption and scattering coefficients $\mu_a$ and $\mu_s$, respectively. The average radiance U(r,t) is a directly measurable quantity that equates to the diffuse energy density.

As previously noted, the above equation for R(Q) is but one solution of the differential equation defining the diffusion approximation approach to the transport of light, as other solutions arising from the use of different boundary conditions are possible as described below.

The differential equation for the diffusion approximation is solved subject to boundary conditions and source specifics, and analytical solutions can be obtained for reflectance and transmittance calculations. Because the phase function is characterized as a single anisotropy factor, the diffusion approximation provides mathematical convenience. Through renormalization, an asymmetry-corrected scattering cross-section that depends only on the average cosine of scattering angle defines the diffusion coefficient D, and therefore, an essentially anisotropic propagation problem is mapped into an almost isotropic one.

It is instructive to note that three length scales characterize the light propagation in this system, the absorption length $l_a = \mu_a^{-1}$, which is the distance traveled by a photon before it is absorbed, the scattering length $l_s = \mu_s^{-1}$, which is the average distance between successive events, and the transport mean free path $l^* = l_s(1-g)$ that defines the distance traveled before the direction of propagation is randomized.

The differential equation for the diffusion approximation can have a number of solutions depending on the conditions imposed upon it when solving it. The equation R(Q) noted above is one of the simplest solutions for reflectance based on using only the absorption coefficient, scattering coefficient and anisotropy factor as inputs while assuming smooth boundary layers. This solution does not take into account other variables such as particle size distribution, coating thickness, surface roughness of the coating, etc. In the equation for R(Q), since the scattering centers are not all of the same size, a size distribution is assumed and used to calculate the effective scattering coefficient and the effective scattering anisotropy, which are then introduced into the equation to calculate the reflectance. The scattering coefficient is dependent on the volume fraction of the scattering centers and the scattering cross section. Practically speaking however, the most important point is the fact that the above model can be conversely used to accurately determine the volume fraction and size distribution of the scattering centers present in a coating from its measured reflectance spectrum over the visible wavelength range by mathematically fitting the calculated reflectance spectrum to the observed reflectance spectrum. If one assumes that the scattering centers present in coating systems are the entrained micropores which define its structure, then the porosity and pore size distribution properties of the coating can be optically determined and the values so determined can be compared with those derived from mercury intrusion porosimetry analysis to assure that the optically determined properties are in good agreement with physically measured values.

Figure 2:
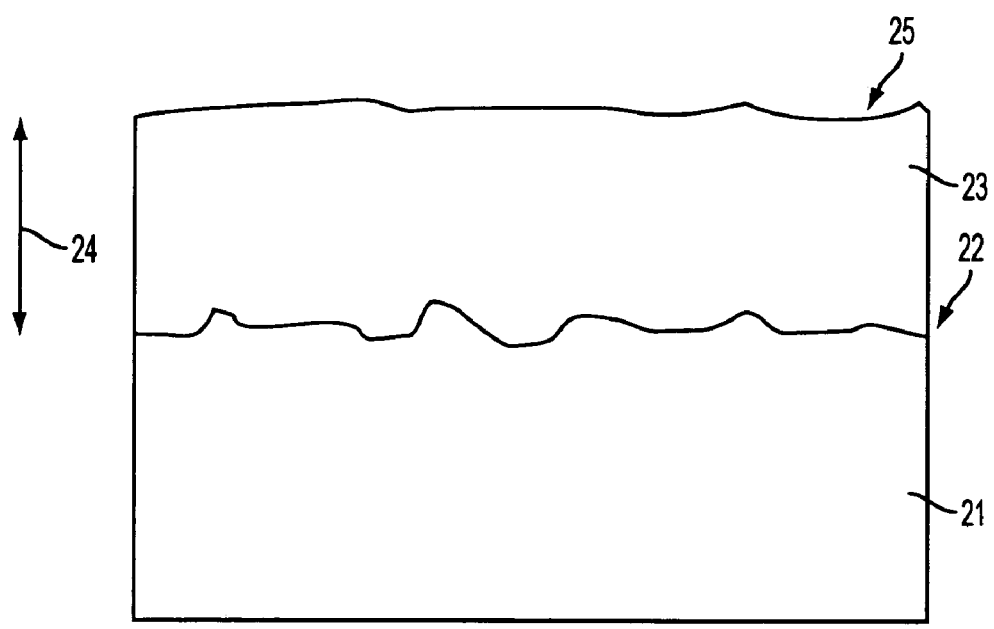
FIG. 2 shows a schematic of a coating system and identifies certain boundary conditions.

Referring now to FIG. 1, the inventive method employs a number of inputs 101–109 to generate one or more outputs 110 that serve as performance property or physical characteristic predictions ("PSD" means pore size distribution). FIG. 1 is a flowsheet representing a number of variable inputs/outputs that have utility with the diffusion approximation model 100 as applied to coating systems. Variables relating to the coating, the base sheet, and the interface between these two materials can be inputted into the diffusion model 100 to obtain one or more optical properties such as TAPPI brightness (reflectance), gloss, and opacity. It is believed that at least the inputs of pigment composition, particle size distribution and coating thickness are necessary to obtain one performance output such as TAPPI brightness or reflectance. FIG. 2 is illustrative of the boundary conditions imposed by the coating system, i.e., a base sheet 21, an interfacial region or boundary layer 22 between the base sheet 21 and coating 23 having thickness 24, and the surface 25 of the coating 23, each having their own set of variables that affect light scattering and performance. It should also be understood as indicated by the double arrows in FIG. 1 that the diffusion model can produce outputs of the variables too, e.g., reflectance as an input into the model with particle size distribution as an output.

While not illustrated in specific detail, other conditions can be described for use in the diffusion equation. Examples include internal reflection and boundary effects as a result of interfacial properties between the pigmented coating and the base sheet. When the refractive index of the diffusive media (i.e., the pigmented coating) is higher than that of the outer media (the base sheet), photons trying to exit the coating system are returned mostly by the total internal reflection process. The diffusion equation can also be solved for different geometries using modified Green's functions to take into account the reflection at the boundary. This solution can therefore account for the effective reflectivity at the interface. This can be important as the effect of reflection is the lowering of the effective diffusion coefficient of the medium.

The diffusion model can also be modified to take into account coating systems having a dense suspension of particles or large volumes of scattering particles. This situation results in multiple light scattering and diffusion of light waves is characterized by the number density of scatterers in the medium and by their scattering strength. In this system the particles are close enough that the scattering centers are not independent and collective scattering has to be considered. This is because the scattering centers are sufficiently close together that the fields scattered by the different centers are partially in phase.

Other diffusion model modifications for coating systems relate to scattering coefficients obtained from either mono- or poly-dispersed particles. These modifications involve the use of particle size distribution and shape factors. At low number densities, the scatters are uncorrelated and the effect of any polydispersivity is a simple addition of scattering contributions from the different species. However, when high number densities of polydispered scatterers are present, an effective scattering coefficient from collective scattering has to be employed.

To confirm that the diffusion approximation model was capable of predicting the characteristics of a pigmented coating system, a study was performed using two known coating formulations, each employing a pigment combination consisting of 50 parts by wt. of a fine particle kaolin clay and 50 parts by wt. of a fine particle calcium carbonate. Five parts by wt. of a common coating latex, DOW 620, was employed in each formulation as the binder. The pigmented coatings were subsequently applied to MYLAR polyester film in order to yield a simplified coating system where the boundary layers can be assumed to be smooth for purposes of employing the diffusion approximation model. One test formulation, Coating A, employed a narrow size distribution for both the clay and calcium carbonate pigments, with the other test formulation, Coating B, employing a broader size distribution for both types of mineral pigment particles. This distinction was used since it is well established that pigmented coatings employing pigments having a narrow particle size distribution give higher performance in terms of optical properties because of the change in the amount and in the size of the microvoids formed (i.e., scattering centers) resulting from their poor particle packing characteristics. In contrast, coating pigments having a broad particle size distribution tend to particle pack extremely well thereby creating fewer and smaller scattering centers in the coating. Thus, using the physical and optical characteristics of these two sets of materials would provide a good comparison between actual characteristics, and the characteristics predicted using the diffusion model.

Coatings formulations A and B per above were applied to a MYLAR film using a band viscometer and then air-dried. Three coat weights (approximately 10, 20 and 30 g/m$^2$) were applied for each test formulation and the strips were double side coated. Standard optical measurements were made on the coated strips using a Technidyne BNL-3 Opacimeter and scattering coefficients (determined via Kubelka-Munk) were calculated.

Porosity analysis via mercury intrusion porosimetry measurements on the coated strips was carried out with a MICROMERITICS Autopore II 9220 Porosimeter. Reflectance measurements over the wavelength range from 450 nm to 700 nm were made with a Cary 500 Spectrophotometer equipped with an integrating sphere.

Analysis of the coated MYLAR strips used optical pathlength spectroscopy and optical near field microscopy in AFM mode. SEM cross section measurements of the coated MYLAR strips were conducted using a Hitachi S4500 electron microscope after the strips were embedded in EPON epoxy resin and then cut with a sliding microtome unit.

Figure 3:
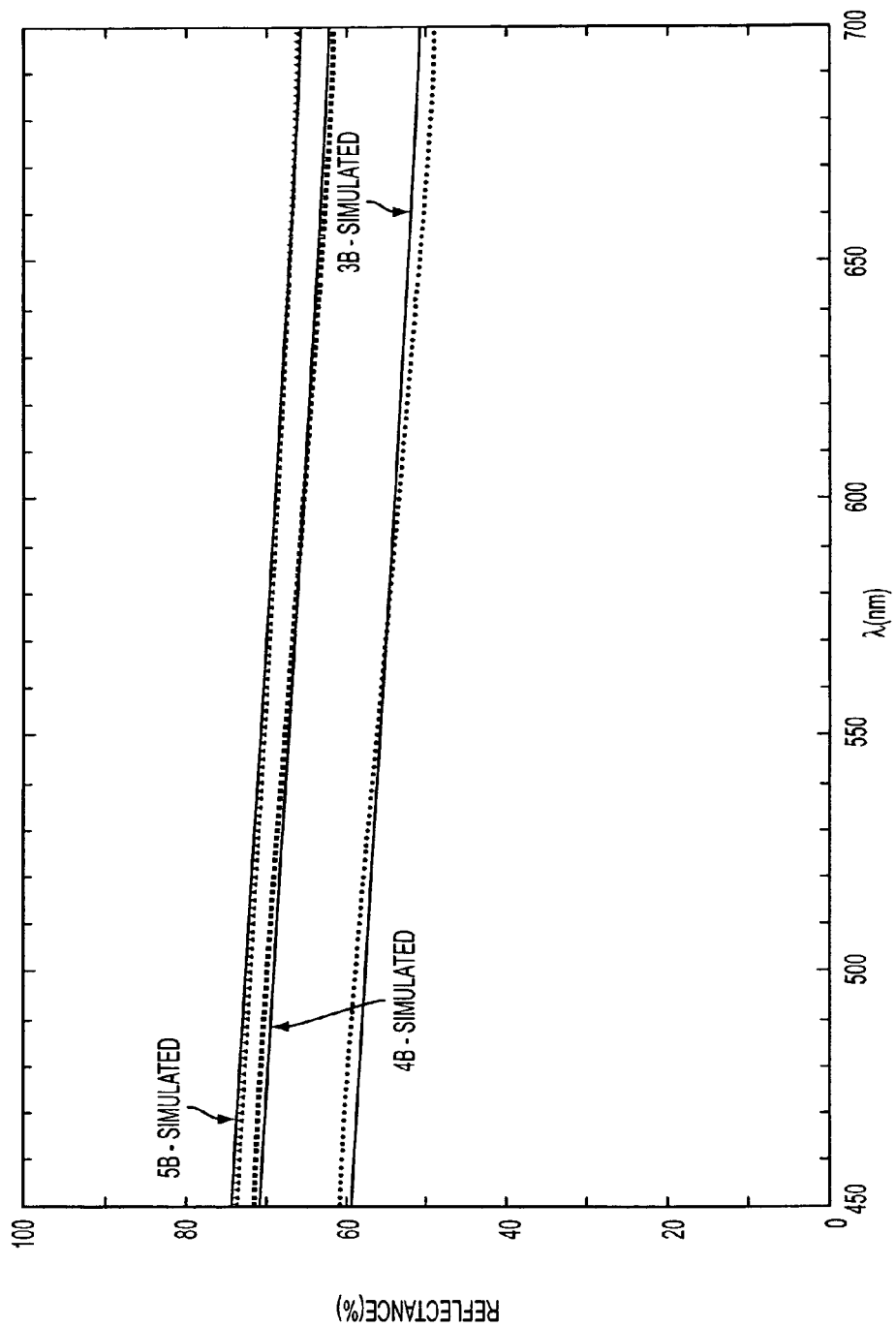
FIG. 3 is a graph relating experimental and simulated reflectance data for one coating formulation (Coating B)
Figure 4:
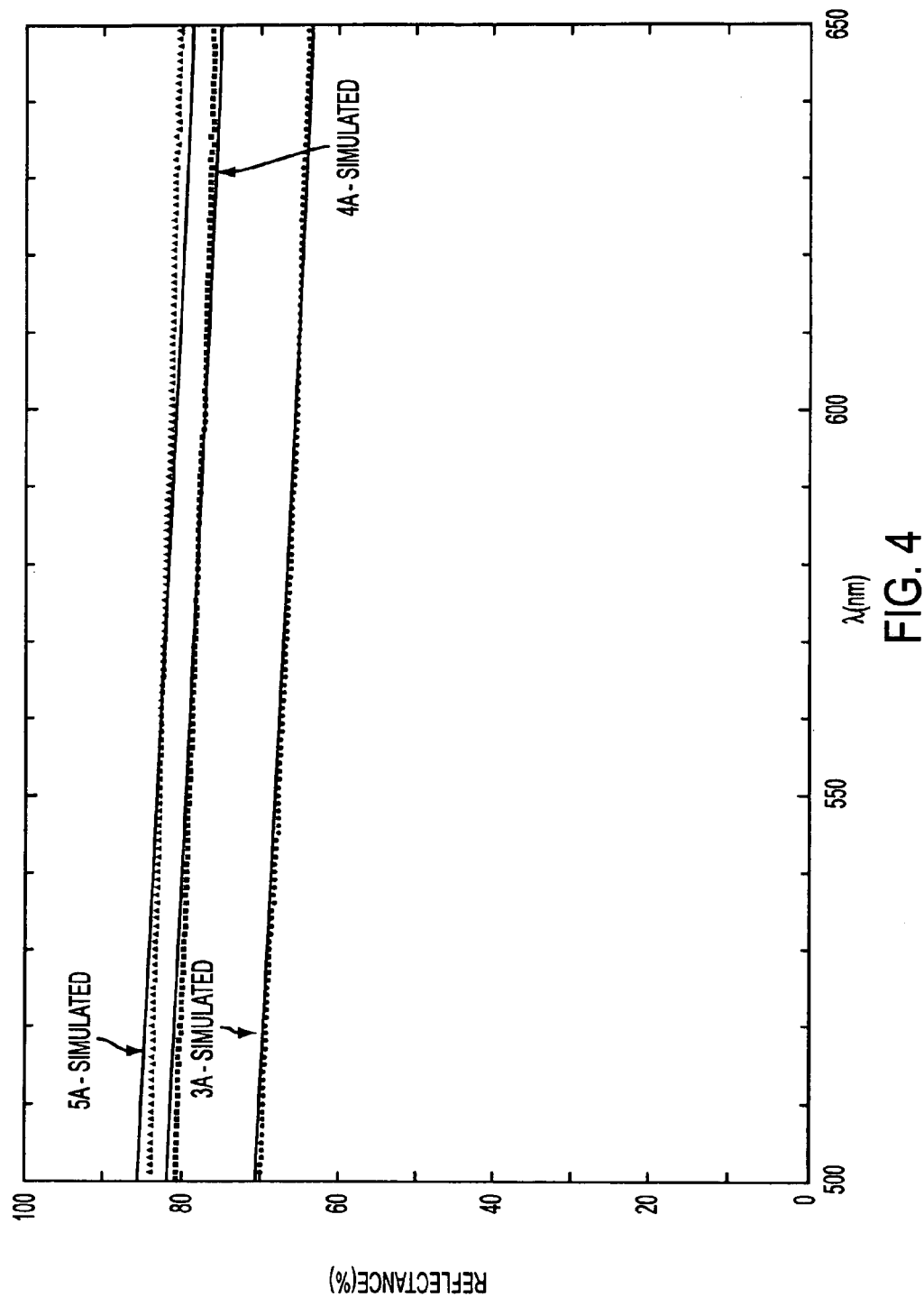
FIG. 4 is a graph relating experimental and simulated reflectance data for a second coating formulation (Coating A)
Figure 5:
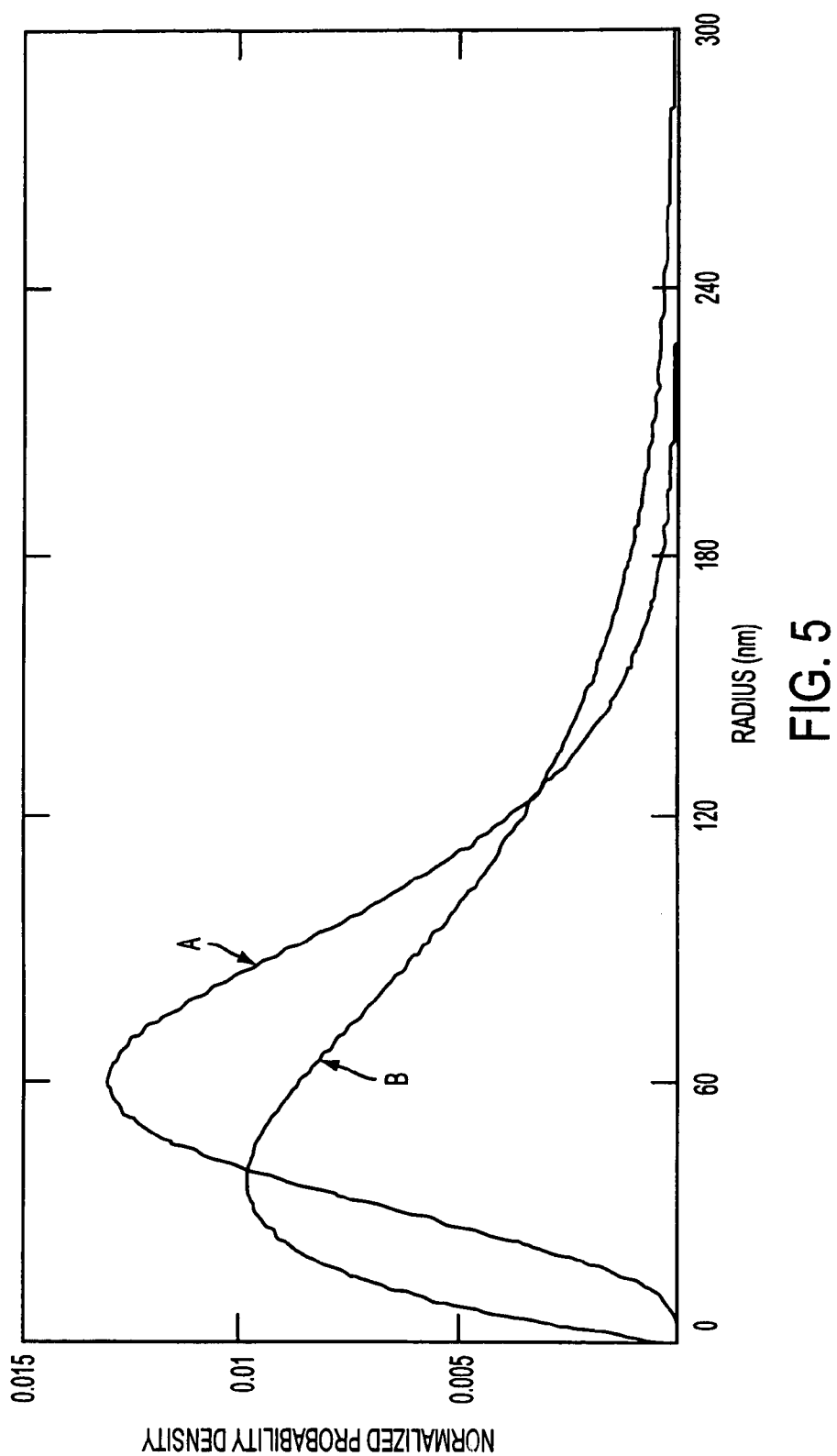
FIG. 5 shows predicted pore size distribution curves using the diffusion approximation model.

As part of the study, the physical characteristics of the coatings were analyzed using prior art techniques relying on K-M theory. These characteristics are reported in Tables I and II. Actual and simulated reflectance measurements are shown in FIG. 3 for Coating B and FIG. 4 for Coating A. FIGS. 3 and 4 each represents a "fit" measurement with the Diffusion model. In FIG. 3, the plot for data "▲" represents 5B-experimental; the plot for data "■" represents 4B-experimental; and the plot for data "♦" represents 3B-experimental. Also, the respective predicted or simulated plot lines 5B, 4B and 3B are identified in FIG. 3. In FIG. 4, the plot for data "▲" represents 5A-experimental; the plot for data "■" represents 4A-experimental; and the plot for data "♦" represents 3A-experimental. Also, the respective predicted or simulated plot lines 5A, 4A and 3A are identified in FIG. 4. The simulated values are used to generate pore size distributions for Coating B and Coating A as plotted as normalized probability density and particle radius as shown in FIG. 5. In FIG. 5, the "s" value for Coating B is 1, while the "s" value of for Coating A is 4. A comparison of actual and predicted peak pore radii is shown in Table III.

Pore volume predictions using the simulated reflectance data are detailed in Table IV and V.

Figure 6:
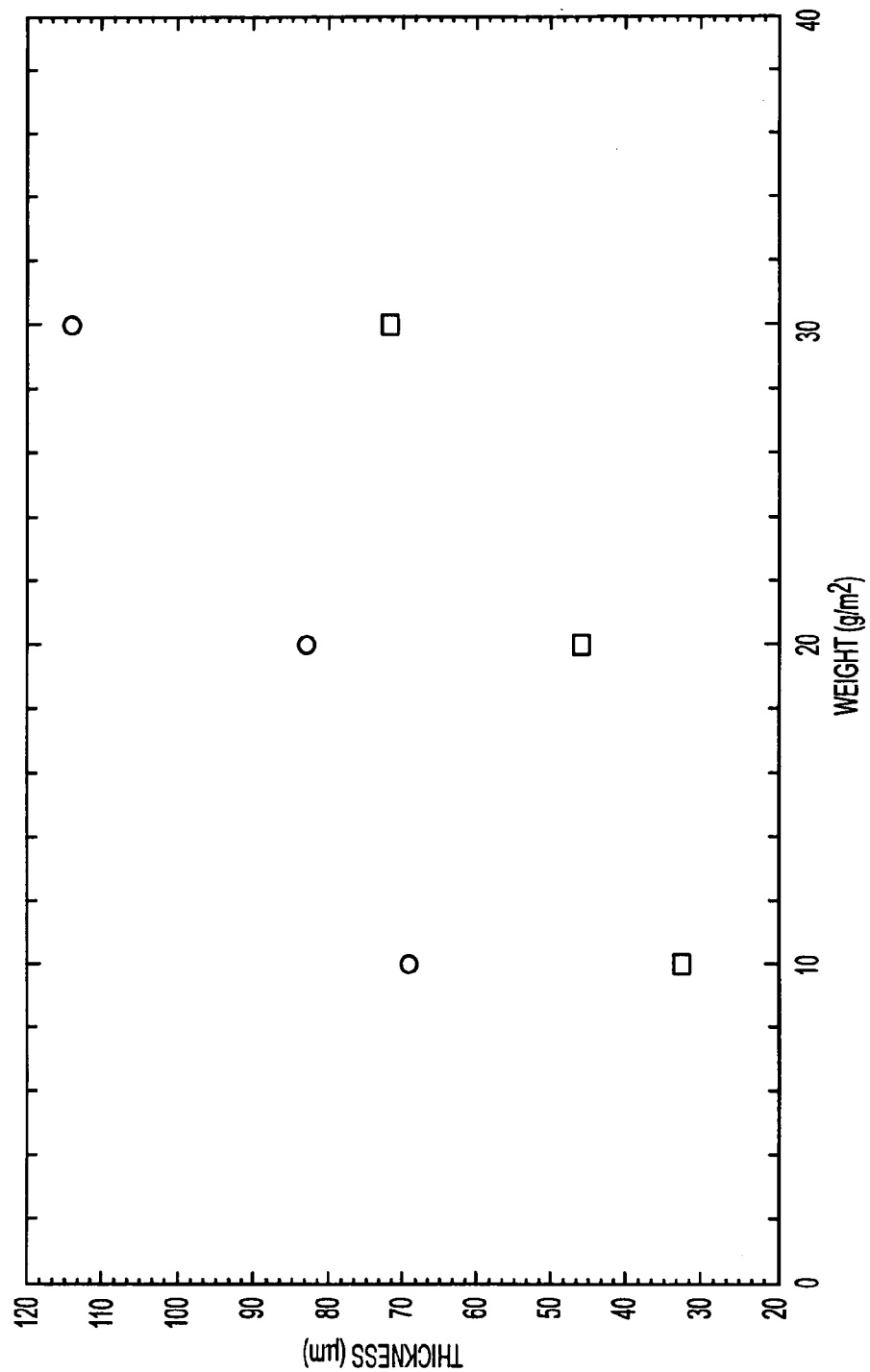
FIG. 6 compares mean optical path distance for two coating formulations.
Figure 7:
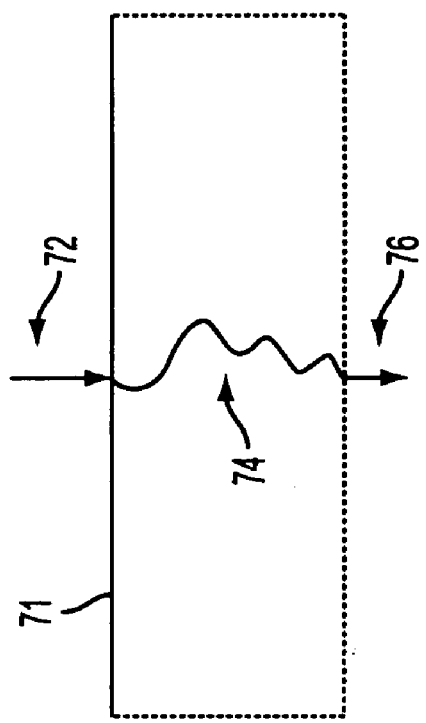
FIG. 7 is an illustrative schematic of the light path through a coated product.
Figure 7:
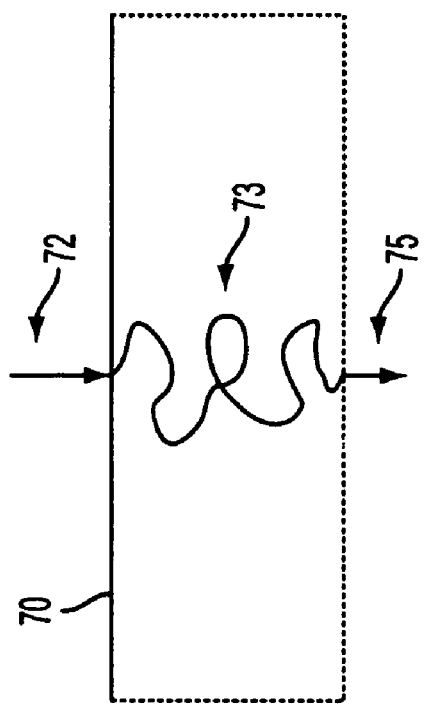

The mean optical distances for the coating formulations are shown in FIG. 6, with FIG. 7 schematically representing the different light paths for the two formulations. In FIG. 6, the data "o" apply to Coating A, while the data "□" apply to Coating B.

These Figures and Tables are discussed in more detail below.

Results/Discussion

The K-M scattering performance of Coatings A and B is summarized in Table I below.

TABLE I

Scattering Coefficients for Coatings A and B

| Sample | Coat Weight, g/m² | Scattering Coefficient (by K-M) |
|---|---|---|
| A | 11.57 | 158.48 |
| A | 20.04 | 147.38 |
| A | 29.40 | 140.97 |
| B | 10.95 | 112.30 |
| B | 20.04 | 102.66 |
| B | 29.34 | 95.88 |

As expected on the basis of increased bulking resulting from poor particle packing, the optical data in Table I clearly demonstrate that Coating A (which is produced from combining the two narrow particle size distribution pigments) yields higher scattering coefficients than Coating B at a given coat weight over the range of coat weights we examined.

TABLE II

Hg Porosimetry Data for Coatings A and B Coated MYLAR Test Strips

| Coating | Coat Weight, g/m² | Peak Pore Diameter, microns | Total Intrusion Volume, ml/g |
|---|---|---|---|
| A | 11.57 | 0.16 | 0.057 |
| A | 20.04 | 0.16 | 0.081 |
| A | 29.40 | 0.15 | 0.100 |
| B | 10.95 | 0.073 | 0.043 |
| B | 20.04 | 0.073 | 0.066 |
| B | 29.34 | 0.073 | 0.081 |

As seen in Table II, the peak pore diameters and total intrusion volumes measured on Coating A by mercury porosimetry, at each coat weight, were greater than the corresponding values measured on Coating B. These porosity results are not unexpected given the poor particle packing that would be anticipated from the narrow distribution pigments that were used in preparing Coating A. However, it is interesting to note that the peak pore diameters measured for either coating system do not change as a function of the applied coat weight.

Applying the diffusion model in combination with visible wavelength reflectance measurements made on the A and B coated strips (see FIGS. 3 and 4), simulated reflectance spectra can be generated and then mathematically refined to match the observed reflectance spectra. The volume fraction of the coating pores ($\rho$), the pore size distribution and the absorption coefficient $\mu_a$ are the input parameters for the diffusion model relative to getting a good fit to a reflectance spectrum; hence, when the absorption coefficient is known the volume fraction and pore distribution can both be optically determined.

Using the diffusion model with the reflectance spectra, pore size distribution curves for Coatings A and B were generated (see FIG. 5). Inspection of FIG. 5, where the "s" parameter is a distribution parameter that increases as the pore size distribution is narrower, shows that Coating A has a much more narrow pore size distribution than for the pores present in Coating B. This pore size trend is in general agreement with the original particle size distribution differences previously noted between the pairs of clay and calcium carbonate pigments used in preparing the A versus B coatings. This shows that the diffusion model successfully modeled the coating system to produce a particle size distribution consistent with the actual distribution. In addition, the peak pore radii optically determined for Coatings A and B were found to be in close agreement with those measured directly by mercury porosimetry (see Table III below for comparative values).

Table III

Comparison of Peak Pore Radii, in nm

| | Coating A | Coating B |
|---|---|---|
| Pore Radii by Diffusion Model | 60–65 | 35–40 |
| Pore Radii by Hg Porosimetry | 75–80 | 35–40 |

Pore volume information on Coatings A and B was also obtained from reflectance-based determinations using the diffusion model. Various normalized pore volume ratios are compared in Tables IV and V for the A and B coatings. Table IV shows that the increase in pore volume fraction is proportionally similar between the A and B coatings as the applied coat weight is increased. The trends and volume ratios are also similar whether using pore volume data from mercury porosimetry or from the diffusion model. In a like fashion, Table V shows good agreement between A/B pore volume ratios determined by mercury intrusion porosimetry versus those obtained from the diffusion model at the three different coat weights. In comparing the A and B coatings, it is interesting to note that the A coatings consistently contain about 30% more pore volume that the B coatings independent of the applied coat weight. The higher pore volume content of the A coatings is consistent with the creation of more scattering centers as a consequence of the poor particle packing obtained with the combination of clay and calcium carbonate pigments having a narrow particle size distribution.

TABLE IV

Comparison of Pore Volume Ratios from Diffusion Model vs. Mercury Porosimetry*

| Coating A | | | Coating B | | |
|---|---|---|---|---|---|
| Sample | Applied Coat Wt. | $\rho_i/\rho_{3A}$ | $V_i/V_{3A}$ | Sample | Applied Coat Wt. | $\rho_i/\rho_{3B}$ | $V_i/V_{3B}$ |
| 3A | Low | 1 | 1 | 3B | Low | 1 | 1 |
| 4A | Medium | 1.66 | 1.42 | 4B | Medium | 1.69 | 1.54 |
| 5A | High | 2.12 | 1.75 | 5B | High | 2.19 | 1.88 |

Note: *$\rho$ = pore volume fractions determined from the Diffusion Model; V = total intrusion pore volumes determined by Hg Porosimetry.

TABLE V

Comparison of Pore Volume Fractions for Coatings A vs. B*

| Sample | Applied Coat wt. | $\rho_A/\rho_B$ | $V_A/V_B$ |
|---|---|---|---|
| 3 | Low | 1.3 | 1.33 |
| 4 | Medium | 1.28 | 1.23 |
| 5 | High | 1.26 | 1.24 |

Note: *$\rho$ = pore volume fractions determined from the Diffusion Model; V = total intrusion pore volumes determined by Hg Porosimetry.

The coating surface topographies were observed by AFM for Coatings A and B. A visual inspection of these two topographies demonstrates that the surface of Coating A is rougher and more open or porous than the surface of Coating B. Given these topographies, one can hypothesize that A has the sharply defined geographical features that would scatter light to a greater extent than B.

Finally, the physical thicknesses of Coatings A and B were compared as determined from SEM cross sections of the coated MYLAR strips relative to the mean optical path-lengths of the transmitted light through Coatings A and B as determined via Optical Path-Length Spectroscopy (Dogariu, A., et. al.; Optics Letters, Vol. 24, No. 7, pp. 442–444, 1999). The comparative thickness and mean path-length values, in microns, for Coatings A and B when applied to MYLAR film at 20 g/m² are reported in Table VI below. In comparing the values for Coatings A and B, the difference in mean optical path-length is much greater than the thickness difference observed in their SEM cross sections. The significant difference in mean optical path-length between Coatings A and B is due to the greater light scattering ability of Coating A from the creation of more scattering centers in the coating that are a consequence of using the narrow particle size distribution pigments.

TABLE VI

Comparative Analysis of Coated MYLAR Films by SEM Cross Section vs. OPS*

| Coatings (@ 20 g/m²) | Thickness by SEM Cross Section, microns | Mean Optical Path-length, microns |
|---|---|---|
| 4A | 9.4 | 42 |
| 4B | 9.1 | 23 |

Note: *Reported values are the average of measurements made on both sides.

FIG. 6 shows the mean optical path-length distances that were measured for Coatings A and B over the range of coat weights applied in this study. The values plotted in FIG. 6 are the combined path-lengths for both sides of applied coating minus the thickness of the MYLAR film (which was 57 microns). The significantly greater mean optical path-length for Coating A is observed over the entire range of coat weights explored and is a direct consequence of its greater light scattering ability. The greater scattering ability of Coating A translates on average to a longer transport path for light through the coating medium as graphically illustrated in FIG. 7. The magnitude of difference in mean optical path-length seen between Coatings A and B cannot be accounted for on the basis of their small difference in physical coating thickness as measured by SEM.

FIG. 7 provides an illustrative comparison of mean optical path-length for coating A (70) and coating B (71), in which incident light 72 and respective optical light paths 73 and 74 are depicted. The transmitted light 75 and 76 also is shown.

In the above example, it should be understood that the solution of the diffusion approximation model used to obtain the reflectance data, and pore size distribution data is one that is based on a smooth boundary layer, i.e., a MYLAR film, and an assumption of an infinitely small coating thickness (zero thickness).

However, it is well within the skill of the radiative transfer art to expand the diffusion approximation model to account for other boundary conditions, such as coating thickness, surface characteristics of the boundary layer, optical properties of the base sheet, structural properties of the base sheet, and the like. This capability allows the diffusion approximation model to be modified so that other variables can be taken into account when using the equation to predict optical and/or physical characteristics, particularly when given a target characteristic. Since it is realized that these variables all have a finite effect on the transmission of radiance into and through the coated base sheet, taking into account the effect of variables such as the boundary layer conditions, properties of the base sheet, will only enhance the predictability of the diffusion approximation model, and allow further optimization of paper coating performance through the selection of one or more variables.

This predictive capability answers a long felt need in the art of coating technology for paper. Using the diffusion approximation model, and a number of different variables, one can better tell why certain combinations of pigments, or certain characteristics of the coating produce the performance that they do. With this knowledge, improvements in coating performance can be more easily achieved by manipulation of the diffusion approximation model and its various inputs to aide the experimentalist in quickly identifying improved coating formulations, and coating/base sheet combinations.

Using the diffusion approximation model and visible wavelength reflectance measurements, the pore volume fractions, the peak pore diameters and the pore size distributions within pigmented coatings can be determined that correlate well with values obtained from more traditional porosity measurements, such as mercury intrusion porosimetry, on a global scale. The diffusion approximation model easily elucidates the structural characteristics of a coated surface that yields more scattering of light.

INDUSTRIAL APPLICABILITY

Using the diffusion approximation model has significant commercial applications and advantages. Presently, development of optimum optical performance for a coating system involves a significant investment in laboratory time and research manpower. For example, a pigmented coating formulation must be made up, applied to a base sheet, and then tested to determine its actual performance as judged by brightness, gloss, opacity, etc. If the desired performance values are not attained, the formulation is modified and reapplied to the base sheet, and the testing procedure is repeated, possibly a number of times. Even in the case of using DOE (design of experiments) protocols a very large number of unique plus replicate experiments may have to be conducted to collect the necessary data for statistical analysis of the results. Using the current invention, with a target performance parameter in mind, the necessary physical properties can be mathematically determined to achieve such performance by merely using the diffusion approximation model equipped with the appropriate set of inputs.

For example, a coated paper manufacturer may have a product that has a certain, brightness, gloss, and opacity. However, the company could expand its market if the coated paper product had two more points of opacity. The diffusion approximation model can be used to determine what is needed to gain the two points of opacity without the need for extensive experimental testing. The physical characteristics of the pigment as well as other conditions pertaining to the coating system could be used as inputs into the diffusion approximation model, with one variable, e.g., size distribution, being changed to produce a predictive opacity output. The predictive value can then be compared to the target opacity value. If the selected size distribution does not predict the desired increase in opacity, another particle size distribution can be used, or another variable can be changed, such as increasing the coating thickness, increasing the pore volume, etc. By means of a computer, the computational process can continue until a system is predicted that would meet the manufacturer's goal, i.e., an increase in opacity of two points.

As a more specific example, inputs to the diffusion approximation model could be: Parameter X1=coating thickness; Parameter X2=porosity (size and size distribution of pigments); Parameter X3=composition (essentially refractive index, structural details of individual scattering centers, scattering coefficient, absorption coefficient, and anisotropy factor); and Parameter X4=boundary layers (roughness of the final coating, and optical properties of the base sheet).

The diffusion approximation model can be used to generate optical properties of coating systems for a specific combination of inputs. The outputs of this formulation can be the conventional descriptors of optical performance, as follows: Parameter Y1=brightness (reflectance as a function of wavelength); Parameter Y2=gloss; and Parameter Y3=opacity.

For example, parameters X1, X2, X3, and X4 can be used as inputs to get one or more of Y1, Y2, and Y3 as outputs. Alternatively, one or more of Y1, Y2, and Y3, along with X1, X3, and X4 can be used as inputs to get X2 as an output. In the first scenario, physical characteristics are used to predict optical performance properties. In the second scenario, optical properties and physical characteristics are used to get another physical characteristic. As in the opacity example discussed above, reflectance data and a targeted opacity value could be used along with certain physical parameters to predict the required particle size and particle size distribution of the pigment.

In a preferred mode, the diffusion approximation model as a mathematical expression with input variables is used as part of a computer program. This quickly enables the user to predictably calculate the optical performance of coatings or one or more physical characteristics, which thereby aids the formulator in the development of coating systems with optimal end-use properties. The noninvasive diffusion approximation model based approach as described herein is not limited merely to predicting and formulating coating systems for substrates such as paper, but also has application to self-supporting sheets per se that contain pigments for adjusting the optical attributes thereof. Using the same basic methodology described above via the example of paper coating systems, a sheet-forming composition containing the pigment and including the enhanced physical characteristic output obtained via the above-described diffusion approximation model can be provided. The sheet-forming composition containing the pigment, such as kaolin clay, titanium dioxide, etc., can be selected, for example, from paper, paperboard, or plastic, and so forth.

In another aspect, the coating technique of the present invention is applicable to the coating of nonporous; non-absorbent substrate materials such as coating (e.g., painting) metal surfaces (e.g., aluminum bodies or sheets), or plastic surfaces (e.g., vinyl bodies or sheets), or other coatable materials having surfaces receptive to the coating system of the present invention described herein.

The invention claimed is:

1. A method of providing at least one optical property of a coating system having a coating adjacent a base sheet comprising:
   a) providing a radiative transfer equation that relates a number of physical characteristics of the coating system selected from the group consisting of coating thickness, coating pore size distribution, coating pigment particle size, a coating pigment particle size distribution, a coating roughness, scattering coefficient, absorption coefficient, anisotropy factor, and optical properties of a base sheet to one or more optical properties for a coating system selected from the group consisting of gloss, brightness, and opacity, wherein providing the radiative transfer equation comprises application of diffusion approximation to transport of light, said diffusion approximation defining average radiance U(r,t) as follows:

$$D\nabla^2 U(r,t) - \mu_a U(r,t) - \partial U(r,t)/\partial t = S(r,t),$$

wherein isotropic source density is denoted by S(r,t), r and t are the variables of position and time, and D is the diffusion coefficient which is defined in units of length as
   $D = 1/3[\mu_a + \mu_s(1-g)]$ in terms of the absorption and scattering coefficients $\mu_a$ and $\mu_s$, respectively, and g is the anisotropy factor;
   b) solving the equation by inputting a number of the physical characteristics of the coating system to obtain at least one optical property output of the coating system; and
   c) formulating a pigment coating including the obtained at least one optical property output.

2. The method of claim 1, further comprising:
   (i) selecting at least one target optical property,
   (ii) comparing the at least one optical property output to the at least one target optical property, adjusting one or more of the physical characteristics and repeating step (b) to obtain another optical property output, and
   (iii) repeating comparing step (ii) until the optical property output corresponds generally to the target optical property.

3. The method of claim 1, wherein the providing of the radiative transfer equation comprises a) using a coating system including a pigment selected from the group consisting of clay and calcium carbonate, and combinations thereof, and b) using a base sheet comprising a paper product.

4. The method of claim 1, further comprising coating the pigment coating upon a paper base sheet effective to form a coated paper.

5. The method of claim 1, wherein the solving the equation by inputting a number of the physical characteristics of the coating system obtains the optical properties including brightness, gloss, and opacity.

6. The method of claim 1, comprising the solving step utilizing a computer.

7. The method of claim 1, comprising inputting at least the scattering coefficient, the absorption coefficient, and the anisotropy factor to obtain a brightness output of the coating system.

8. The method of claim 1, further comprising coating the pigment coating upon a base sheet effective to form a coating thereon.

9. The method of claim 1, further comprising coating the pigment coating upon a base sheet comprising a paper product effective to form a coating thereon.

10. The method of claim 1, wherein the formulating of the pigment coating comprises including pigment selected from the group consisting of clay and calcium carbonate, and combinations thereof.

11. The method of claim 1, wherein solving the equation further comprises determining diffuse reflectance, R(Q), using the mathematical expression:

$$R(Q) = \frac{3Q(1+Q+Qg)\left(\dfrac{Q}{3-3g+3Q}\right)^{-1/2} - 3[(1+Q)^2 + g(-1+Q+Q^2)]}{(-1+g-Q)\left(3+2\left(\dfrac{3Q}{1-g+Q}\right)^{1/2}\right)};$$

$$Q = \frac{\mu_a}{\mu_s}.$$

12. A method of predicting at least one physical characteristic of a coating system having a pigment coating adjacent a base sheet comprising:
  a) providing a radiative transfer equation that relates a number of physical characteristics of the coating system selected from the group consisting of coating thickness, coating pore size distribution, a coating pigment particle size distribution, a coating roughness, and optical properties of a base sheet to one or more optical properties for a coating system selected from the group consisting of gloss, brightness, and opacity, wherein providing the radiative transfer equation comprises application of diffusion approximation to transport of light, said diffusion approximation defining average radiance U(r,t) as follows:

$$D\nabla^2 U(r,t) - \mu_a U(r,t) - \partial U(r,t)/\partial t = S(r,t),$$

wherein isotropic source density is denoted by S(r,t), r and t are the variables of position and time, and D is the diffusion coefficient which is defined in units of length as
  $D=1/3[\mu_a+\mu_s(1-g)]$ in terms of the absorption and scattering coefficients $\mu_a$ and $\mu_s$, respectively, and g is the anisotropy factor; and
  b) solving the equation by inputting a number of the physical characteristics and at least one optical property to obtain the at least one physical characteristic output based on a coated system employing the inputted physical characteristics and the at least one optical property; and
  c) formulating a pigment coating including the at least one physical characteristic output.

13. The method of claim 12, further comprising:
  (i) selecting a target optical property;
  (ii) using the target optical property in step (b) as the at least one optical property to obtain at least one physical characteristic output.

14. The method of claim 12, comprising the physical characteristic output corresponding to coating pore size distribution.

15. The method of claim 12, comprising using a computer for performing the solving step.

16. The method of claim 12, further comprising coating the pigment coating upon a paper base sheet effective to form a coated paper.

17. The method of claim 12, comprising the optical property of the base sheet being one of brightness, gloss, or opacity.

18. The method of claim 12, wherein the providing of the radiative transfer equation comprises using a coating system including a pigment selected from the group consisting of clay and calcium carbonate, and combinations thereof, and using a base sheet comprising a paper product.

19. The method of claim 12, wherein solving the equation further comprises determining diffuse reflectance, R(Q), using the mathematical expression:

$$R(Q) = \frac{3Q(1+Q+Qg)\left(\dfrac{Q}{3-3g+3Q}\right)^{-1/2} - 3[(1+Q)^2 + g(-1+Q+Q^2)]}{(-1+g-Q)\left(3+2\left(\dfrac{3Q}{1-g+Q}\right)^{1/2}\right)};$$

$$Q = \frac{\mu_a}{\mu_s}.$$

20. A method of predicting at least one physical characteristic of a coating system having a coating adjacently contacting a substrate comprising:
  a) providing a radiative transfer equation that relates a number of physical characteristics of the coating system selected from the group consisting of coating thickness, coating pore size, a coating pigment particle size distribution, a coating roughness, and optical properties of a substrate comprising metal or plastic to one or more optical properties for a coating system selected from the group consisting of gloss, brightness, and opacity, wherein providing the radiative transfer equation comprises application of diffusion approximation to transport of light, said diffusion approximation defining average radiance U(r,t) as follows:

$$D\nabla^2 U(r,t) - \mu_a U(r,t) - \partial U(r,t)/\partial t = S(r,t),$$

wherein isotropic source density is denoted by S(r/t), r and t are the variables of position and time, and D is the diffusion coefficient which is defined in units of length as
  $D=1/3[\mu_a+\mu_s(1-g)]$ in terms of the absorption and scattering coefficients $\mu_a$ and $\mu_s$, respectively, and g is the anisotropy factor; and
  b) solving the equation by inputting a number of the physical characteristics and at least one optical property to obtain the at least one physical characteristic output based on a coated system employing the inputted physical characteristics and the at least one optical property; and
  c) formulating a pigment coating including the at least one physical characteristic output.

21. The method of claim 20, further comprising coating the pigment coating upon a substrate effective to form a coating thereon.

* * * * *